(12) United States Patent
Eslambolchi et al.

(10) Patent No.: US 7,257,305 B1
(45) Date of Patent: Aug. 14, 2007

(54) METHOD AND APPARATUS FOR REMOVING AN ISOLATION CLOSURE FROM A FIBER OPTIC CABLE

(75) Inventors: Hossein Eslambolchi, Los Altos Hills, CA (US); John Sinclair Huffman, Conyers, GA (US); David W Roberts, Coppell, TX (US)

(73) Assignee: AT&T Corp., New York, NY (US)

( * ) Notice: Subject to any disclaimer, the term of this patent is extended or adjusted under 35 U.S.C. 154(b) by 509 days.

(21) Appl. No.: 10/940,435

(22) Filed: Sep. 14, 2004

(51) Int. Cl.
*G02B 6/00* (2006.01)
(52) U.S. Cl. ............... 385/136; 385/134; 385/135; 385/100
(58) Field of Classification Search ........ 385/134–139, 385/95, 99, 100, 101, 107, 109; 29/428, 29/439, 458, 464
See application file for complete search history.

(56) References Cited

U.S. PATENT DOCUMENTS 5,074,639 A * 12/1991 Smith .................... 385/100
2005/0078923 A1* 4/2005 Dapelo et al. ........... 385/109

* cited by examiner

*Primary Examiner*—Hemang Sanghavi

(57) ABSTRACT

The present invention is an apparatus and method for repairing an isolation gap in a fiber cable after removing an isolation closure from the cable. A flexible, curable polymeric material is first applied in the gap over the fiber buffer tube. A flexible wire mesh strengthening member is then placed over the gap and over the exposed metallic elements of the fiber cable on both sides of the gap. The strengthening member is closed around the fiber cable and is woven with the metallic elements of the cable. A heat shrink material is then applied over the strengthening member and is sealed by heating. The heat shrink material may be sealed with a polymer sealant.

22 Claims, 5 Drawing Sheets

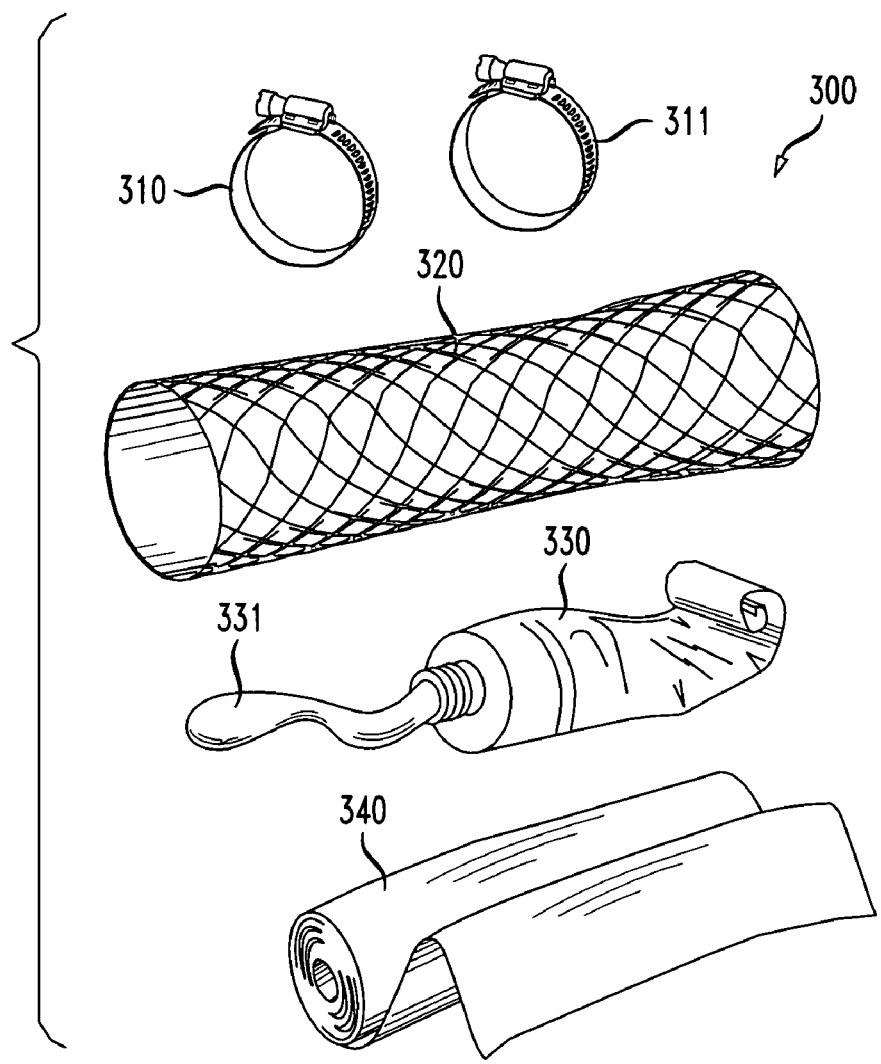
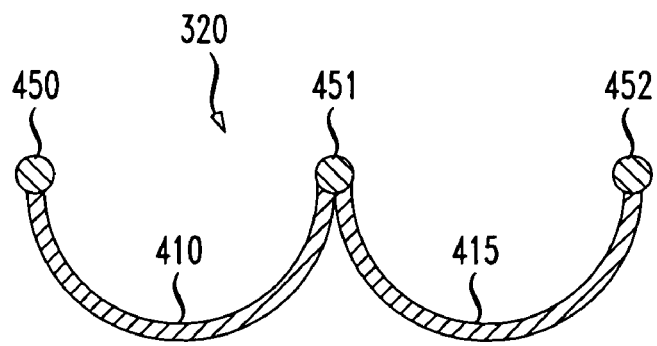

METHOD AND APPARATUS FOR REMOVING AN ISOLATION CLOSURE FROM A FIBER OPTIC CABLE

FIELD OF THE INVENTION

The present invention relates generally to the maintenance of optical fiber cables. More particularly, the present invention is an apparatus and method for repairing an electrical isolation gap in fiber optic cable sheathing after moving or removing a protective isolation closure.

BACKGROUND OF THE INVENTION

Fiber optic cables that enter buildings are commonly fitted with an isolation closure at the cable entrance of the building. The isolation closure isolates the electrically-conducting metallic elements of the fiber cable outside the building from the building itself by creating a gap in the metallic components of the cable. Most modern building codes require such an arrangement to be placed at the cable entrance to a building for protection from stray voltages and lightning. The arrangement protects systems contained within the building, such as telecom systems, computer networks and electrical power systems.

A schematic cross section of a typical optical fiber cable 200 is shown in FIG. 2. A bundle of individual optical fibers 210 is protected by a poly buffer 220 and is sealed by a water blocking tape 230. Surrounding the water blocking tape 230 is a group of strengthening wires such as piano wires 240. Those wires provide tensile strength for pulling the cable through conduit, as well as providing stiffness to prevent microbending of the fibers. The wires 240 are surrounded by a copper or stainless steel sheath 250 that provides additional protection and also provides a conductor for cable locating current used in locating the cable underground. A poly coating 260 is applied over the sheathing 250 for protection and reduced friction when pulling the cable through conduit.

A schematic illustration of an isolation closure installation 100 is shown in FIG. 1. A foundation wall 110 separates the interior of the building 112 from the ground 120. A fiber cable 125 contains a metallic portion 128, including a copper or stainless steel sheath and wire strengthening members. The cable 125 enters the interior 112 of the building through the foundation wall 110.

The poly coating is removed from a section of a cable 125, exposing a length of the metallic portion 129, 130. To isolate electrical surges traveling through the metallic portion 128 from damaging systems in the building, a roughly 6-inch gap 133 is made in the metallic portion of the cable, isolating the sections 129 and 130, and exposing the section 132 of poly buffer and possibly water blocking tape still containing the fiber bundle.

The metallic portions 129, 130 are clamped in an isolation closure 140 using clamps 135, 136. The closure is typically a cylindrical enclosure constructed of a thermoplastic or other electrically insulating material. The clamps 135, 136 and closure 140 provide rigidity to the otherwise weakened gap 133 of the fiber cable 140. Additionally, the clamp 135 may serve as a ground connection through a grounding wire 150 to ground 155. A stray power surge induced by a lightning strike or other phenomenon and traveling on the metallic portion 128 of the fiber will thereby be conducted to ground and will be isolated to prevent damage to building electrical systems.

Occasionally, maintenance or construction requires that work be done on the isolation enclosure. For example, a building may be enlarged, requiring that the isolation closure be moved to a different location on the cable, and further requiring that the section of cable formerly enclosed in the isolation closure be pulled through additional conduit. In another example, spare cable within the building must be pulled through the wall to provide additional cable length for a project on the outside of the building. In each case, the cable section that was formerly inside the isolation closure is very vulnerable when removed from the closure, because the metallic section is no longer intact to protect the fibers from microbending and from tensile loads. The cable must be protected at that point to allow it to be pulled through conduit or placed into any stressful environment. In the prior art, often the only available solution was to replace the section of cable.

There is therefore presently a need for a reliable method and apparatus for repairing the cable section enclosed in the isolation closure. Such a technique must provide protection from microbending, must provide a tensile member to absorb the tensile forced applied in pulling the cable through conduit, and must protect the components within the cable from mechanical damage and water damage. The technique should be relatively low cost, and should be easily learned by an OSP technician. To the inventors' knowledge, there is currently no such apparatus or method employed to satisfactorily accomplish that task.

SUMMARY OF THE INVENTION

The present invention addresses the needs described above by providing an apparatus and a method for repairing an isolation gap when removing an isolation closure from an optical fiber cable. In one embodiment, an isolation gap repair kit is provided. The kit has component parts capable of being assembled in the field to repair an isolation gap in an optical fiber cable. The isolation gap has metallic components of the cable removed to expose a poly sheath surrounding a fiber bundle, and the cable has metallic components exposed on either side of the isolation gap. The repair kit includes a quantity of polymer compound sufficient to fill a vacant space within the isolation gap. The compound is formulated to cure after being applied in the vacant space, whereby fibers in the fiber bundle are protected from microbending. The kit also includes a metallic strengthening member adapted to be affixed to the exposed metallic components on either side of the isolation gap. The strengthening member has attachment features that lock to the exposed metallic component, and is further adapted to at least partially surround the polymer compound in the isolation gap. The kit also includes a sheet of sealing material having a length sufficient to extend beyond ends of the strengthening member and a width sufficient to wrap around the strengthening member as installed on the cable, thereby protecting the isolation gap from moisture.

The metallic strengthening member may include a cylindrical wall of wire mesh. In that case, the attachment features may be wires extending from edges of the mesh for weaving into the exposed metallic portion of the fiber optic cable. Alternatively, the attachment features may be hose clamps.

The kit may further comprise a dispensing container for the curable polymer compound. The curable polymer compound may be a silicone compound.

The metallic strengthening member may include first and second half-cylindrical members having first lengthwise edges joined by a hinge member. Those first and second half-cylindrical members may further have second lengthwise edges with locking members whereby the second lengthwise edges may be interlocked to form a complete cylinder. The first and second half-cylindrical members may be wire mesh, in which case the locking members are mesh loops interlocked by a wire threaded through the loops.

The kit may further comprise a poly sealant for sealing edges of the sheet-like sealing material. The sheet-like sealing material may be a heat-shrink material.

In another embodiment of the invention, a method is provided for repairing an isolation gap after removing an isolation closure from an optical fiber cable. The isolation gap includes a central gap in the metallic portion of the cable and two edge regions wherein the metallic portion is exposed.

The method includes the steps of applying a polymer compound in the central gap, attaching a metallic strengthening member to the metallic portion exposed in both edge regions whereby the strengthening member bridges the central gap, and applying a sealing material over the metallic strengthening member.

The step of applying the sealing material may include wrapping a sheet-like material over the metallic strengthening member. The sheet-like material may be a heat-shrink material, in which case the method further comprises the step of applying heat to the sheet-like material to seal the material over the isolation gap.

The step of attaching a metallic strengthening member to the metallic portion may further include weaving mesh wires of the strengthening member with wires of the metallic portion.

The method may further include the step of curing the polymer compound. Further, the method may include the step of applying a polymer sealant along edges of the sealing material.

The method may also include the step of closing the metallic strengthening member on the exposed metallic portion and the polymer compound by joining edges of the strengthening member with at least one wire threaded though openings in the edges.

In another embodiment of the invention, a strengthening component is provided for use in repairing an isolation gap when removing an isolation closure from an optical fiber cable. The component comprises a first curved wire mesh member forming a half-cylindrical surface having a straight hinge edge, a straight joining edge and two semi-circular edges, a second curved wire mesh member forming a half-cylindrical surface having a straight hinge edge, a straight joining edge and two semi-circular edges, at least one hinge component joining the hinge edge of the first member with the hinge edge of the second member, and at least one locking member for locking the joining edge of the first member with the joining edge of the second member.

The locking member may be a wire threaded through openings in the mesh; the hinge component may be a wire threaded through openings in the mesh. Each wire mesh member may further comprise free mesh wires on the semi-circular edges for weaving with metallic portions of the optical fiber cable, whereby tensile forces on the optical fiber cable are absorbed by the members.

BRIEF DESCRIPTION OF THE DRAWINGS

FIG. 3 is a schematic view of a kit for repairing an isolation gap according to one embodiment of the invention.

FIG. 4 is a schematic cross sectional view of a strengthening member according to one embodiment of the invention.

DESCRIPTION OF THE INVENTION

A kit 300 according to the invention for repairing an isolation gap in a fiber optic cable after removing an isolation closure is shown in FIG. 3. The kit includes a flexible poly compound 331 that may be applied around the exposed poly sheath or water blocking tape in the isolation gap. The flexible poly compound may be contained in a tube 330 or other dispensing device for convenience. In a preferred embodiment, the poly compound 331 is a hardening silicone gel in epoxy form, with two parts to be mixed before applying to the cable. In that case, two tubes 330 may be provided. The compound may be air curing or may be UV curing.

Figure 2:
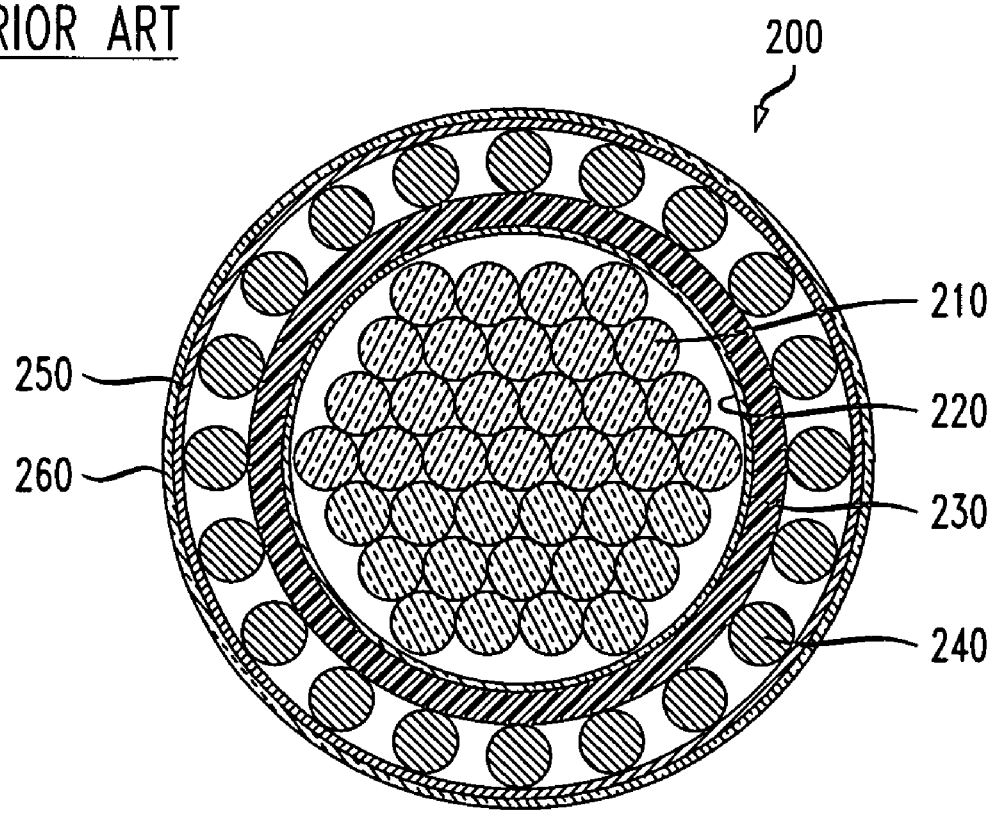
FIG. 2 is a cross sectional view of one type of known fiber optic cable.

After application and curing, the flexible poly compound 331 allows the cable to remain somewhat bendable and moveable while preventing kinking of the cable and microbending of the fibers in the gap. The compound 331 also provides bulk fill between the exposed poly buffer 220 and fiber core 210 (FIG. 2) of the optical fiber cable and the metallic strengthening member 320 of the repair kit, which is applied next.

Figure 1:
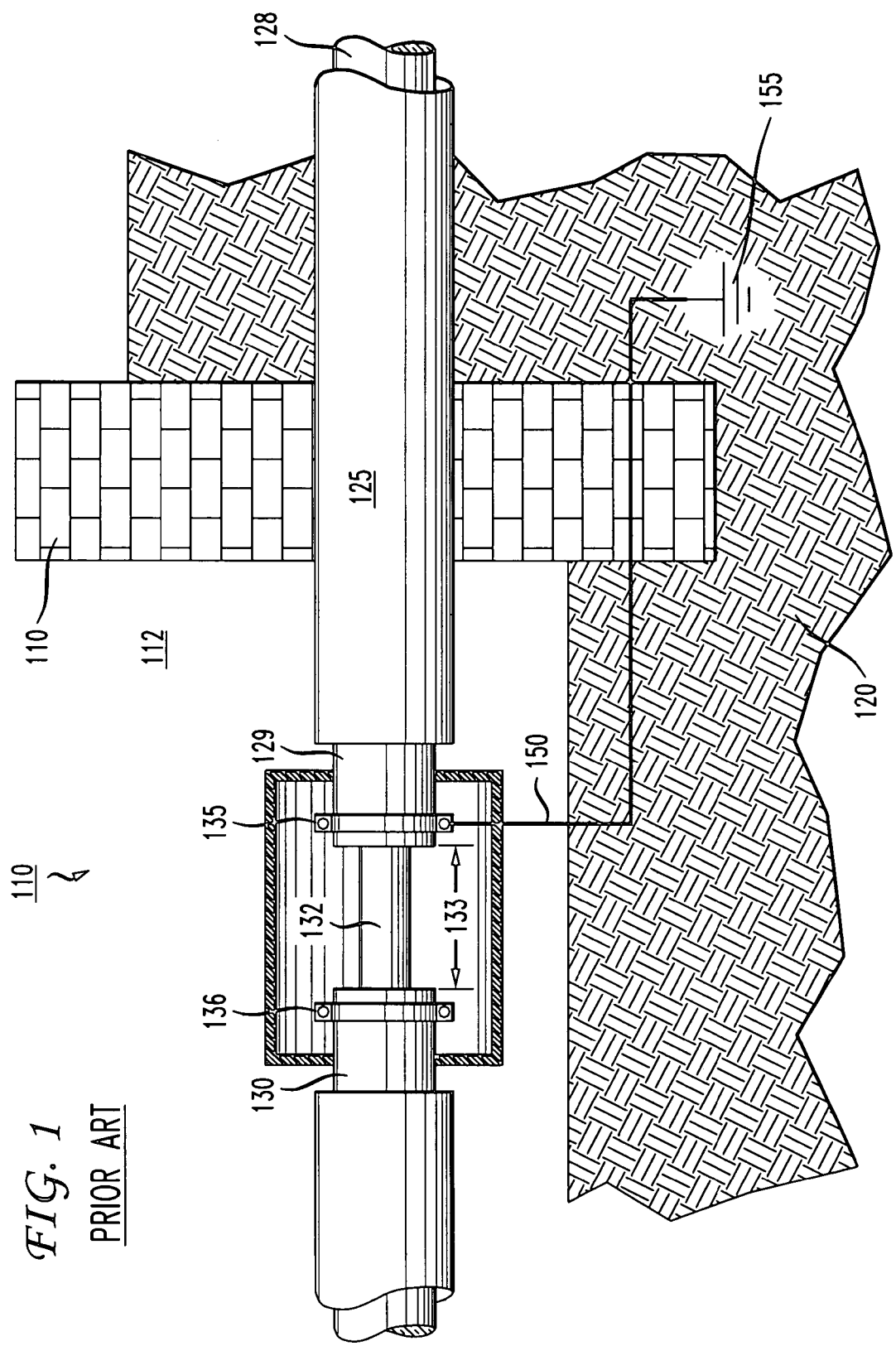
FIG. 1 is a schematic cross sectional view of an isolation closure installed on fiber optic cable service to a building.

The metallic strengthening member 320 is applied to contact the metallic portions 129, 130 (FIG. 1) of the optical fiber cable on both sides of the gap. The cable will have the outer poly layer 260 (FIG. 2) removed near the edges of the gap so the strengthening member comes into direct and electrically conducting contact with those metallic portions of the cable. The strengthening member is constructed of a conducting material, preferably a wire mesh. That construction provides electrical continuity between the two previously isolated metallic portions of the cable. The metallic strengthening member fits snuggly around the polymer compound, preventing relative movement between the optical fibers and the strengthening member.

In one embodiment, the strengthening member 320 is constructed in two halves, as shown in the cross sectional view of FIG. 4. In that construction, the strengthening member includes two metallic members 410, 415, each having a semi-circular cross section as seen in FIG. 4, and each comprising one-half of a cylindrical surface. The strengthening member is hinged along straight hinge edges 451. For example, a wire may be threaded through openings or eyelets formed in the metallic halves. In the case where the metallic halves are constructed of a wire mesh material, the wire may be threaded through openings in the mesh in a weaved hitch that permits the halves to be fitted snuggly around the poly tube 220.

Straight edges 450, 452 of the halves 410, 415 opposite the hinge edge 451 are provided with locking members for joining the halves around the fiber optic cable. In the preferred embodiment wherein the halves are wire mesh, the locking member may be a wire that threads through openings in the wire mesh.

Returning to FIG. 3, the kit may also include attachment features 310, 311 such as a screw and metallic plates that will lock the wire mesh to the metallic part of the cable. The attachment features are fixed on both ends of the gap in the fiber cable. The attachment features 310, 311 may alternatively be integral features in the strengthening member that may be tightened around the metallic portions 129, 130 of the optical fiber cable, or may be mesh wires extending from the ends of the strengthening members that may be woven with the strengthening wires 240 (FIG. 2) of the fiber optic cable. The attachment features must be capable of withstanding tensile forces placed on the fiber optic cable as the cable is pulled through conduit. The attachment features must also insure a reliable electrical connection between the two previously isolated portions 129, 130 (FIG. 1) of the metallic portion of the cable in order to conduct power surges to ground and also to conduct cable locating currents that are transmitted through the cable.

A sheet 340 (FIG. 3) of heat shrink material is also provided in the kit, for placing around the repaired gap to protect the wire mesh from being grounded. The material 340 has dimensions sufficient to completely cover the strengthening member both circumferentially and axially. In addition to electrically insulating the strengthening member from outside conductors, the heat shrink material also provides some water resistance and protection from mechanical damage. Further, heat shrink material provides a smooth surface to reduce friction and the associated tensile forces as the repaired cable is pulled through conduit.

Figure 5A:
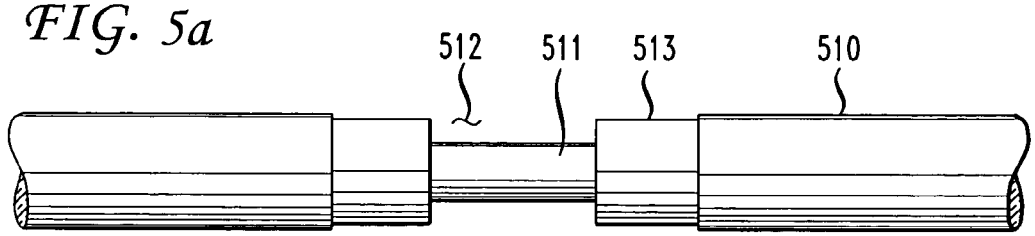
FIGS. 5a-5e are schematic views of a fiber optic cable illustrating a repair method view according to one embodiment of the invention.
Figure 5B:
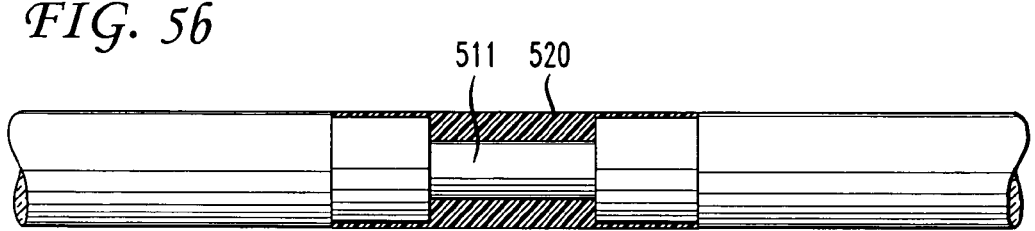
Figure 5C:
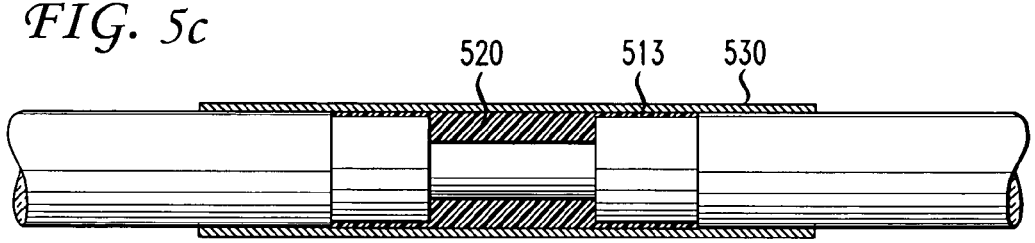
Figure 5D:
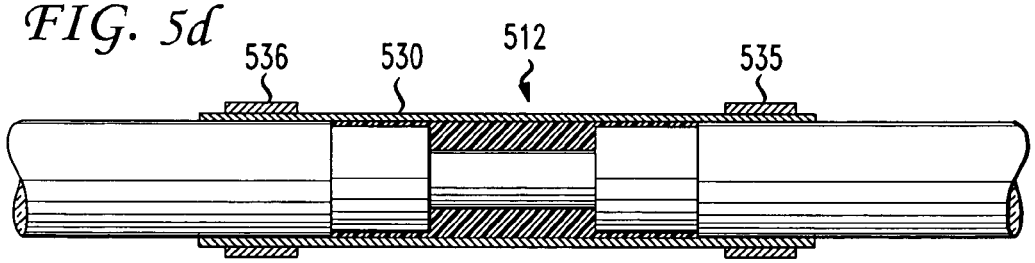
Figure 5E:
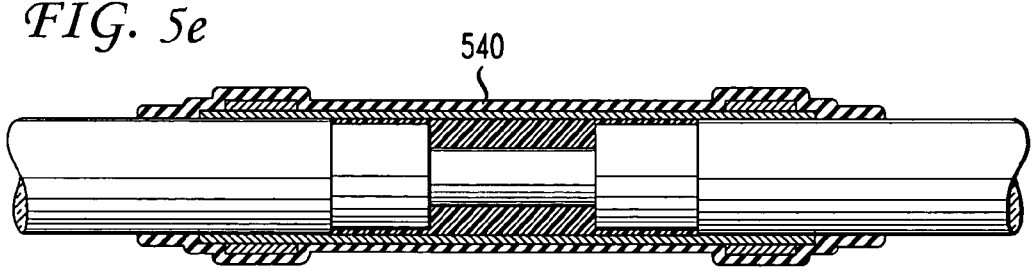

A technique for repairing a fiber cable in accordance with the invention is illustrated in FIGS. 5a-5e. The cable 510 of FIG. 5a is shown as it is when removed from an isolation closure. An isolation gap 512 is created when the isolation closure is installed, stripping away the metallic portions of the fiber cable in a 6-inch section. The fiber bundle 511 remains, enclosed in a poly buffer tube. Water repellant tape may or may not have been removed. The fiber bundle 511 is structurally unsupported and is vulnerable to bending and stretching under forces typically seen in cable handling.

An overlying poly coating will also have been stripped away in the regions 513 immediately abutting the gap 512. The coating was originally stripped away in order to provide electrical continuity between the then-exposed metallic elements in the fiber cable and the clamps 135, 136 (FIG. 1) in the isolation closure. That continuity provided a ground path for the entering cable, as described above.

A poly material 520 (FIG. 5b) is then applied over the fiber bundle 511 and buffer tube to serve as a protector of the fibers. The poly material allows the cable to be moved without creating microbends at that spot in the cable. The poly material fills the space between the fiber bundle 511 and a strengthening member 530 later installed around the outside diameter of the cable, preventing kinking.

A strengthening member such as a wire mesh cylinder 530 (FIG. 5c) about 20 inches long is installed over the outside diameter of the fiber cable, contacting the exposed regions 513 of the metallic portion of the cable. As noted above, the strengthening member may be hinged on one side and have a joining member such as a woven wire on the other side. That allows the wire mesh to be placed around the fiber cable, and the attachment member to be woven around, or otherwise attached to, the fiber cable to make a snug fit. An electrical contact is made between the strengthening member and each of the exposed regions 513 of the metallic portion of the fiber cable.

Bond clamps 535, 536 (FIG. 5d) are installed around the strengthening member 530 for bonding the metallic strengthening member to the fiber cable. The bond may comprise plates and a screw connection to hold the wire mesh and the strengthening members together. Alternatively, a device similar to a commonly available hose clamp may be used for that purpose. Importantly, the bond between the strengthening member and the fiber optic cable on either side of the gap 512 must be sufficiently strong to withstand the tensile forces placed on it as the cable is pulled through conduit, without slippage, which would place strain on the optical fibers. The bond clamps may be placed near the exposed areas of the cable metallic portions of the fiber cable, to enhance the electrical contact between the fiber cable and the strengthening member.

A heat shrink blanket 540 (FIG. 5e) is then wrapped around the wire mesh strengthening member that has been placed around the fiber cable. The heat shrink blanket provides a protective cover for the wire mesh to prevent it from touching ground, as well as performing the other functions described above.

A poly sealant (not shown) may be applied along the edges of the heat shrink blanket to enhance its waterproof properties.

Figure 6:
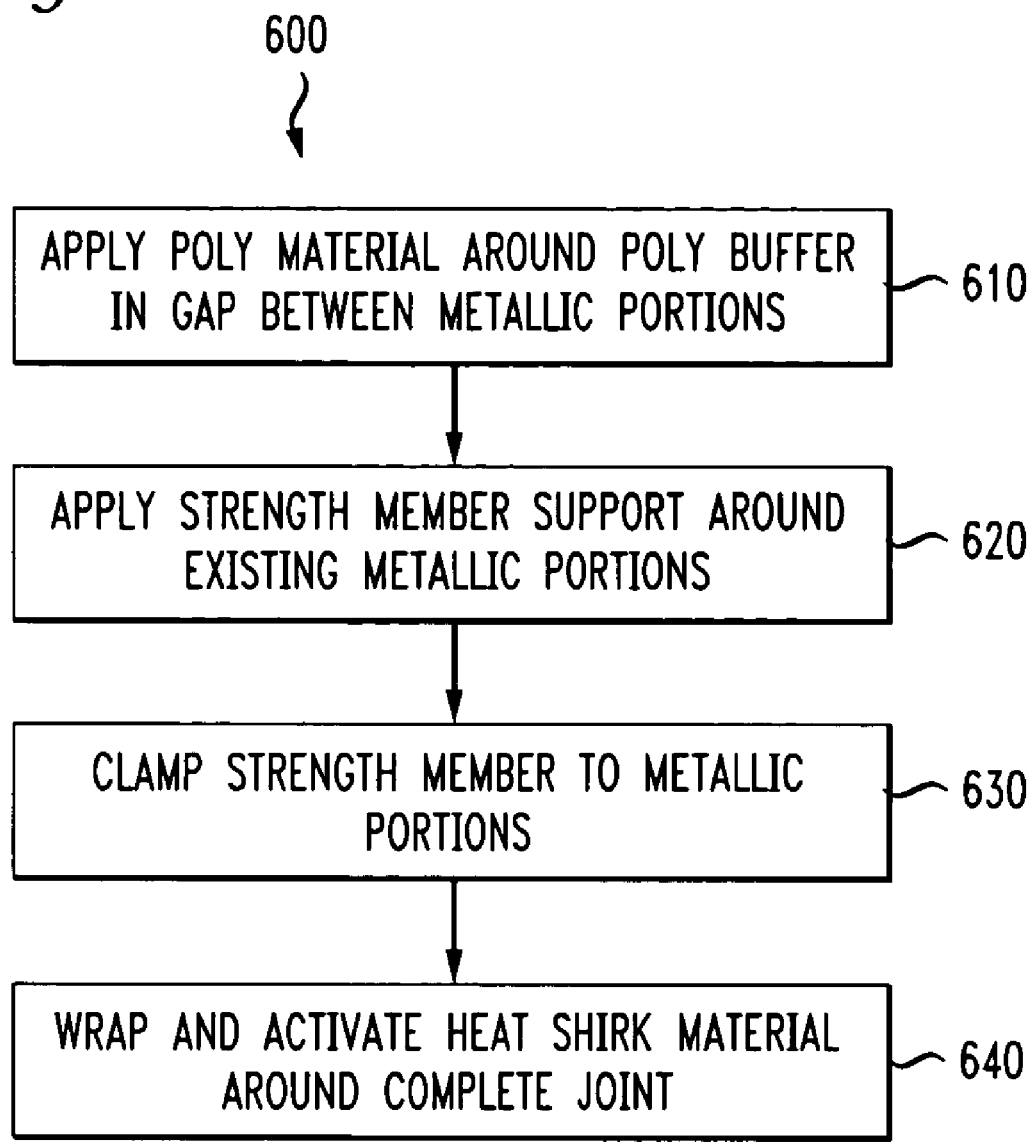
FIG. 6 is a flow chart illustrating a repair method according to one embodiment of the invention.

A method 600 for repairing a fiber optic cable in accordance with the invention is shown in FIG. 6. A poly material is first applied (step 610) in the gap created between the metal portions of the fiber optic cable. A strengthening member is then applied (step 620) around the existing metallic portions. The strengthening member is clamped (step 630) or otherwise attached to the metallic portions. The entire strengthening member is then wrapped (step 640) with a heat shrink material, and the heat shrink material is activated by heating.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a wire mesh strengthening component, the method and apparatus of the invention may be used with strengthening components constructed of other conducting materials. For example, the structural component may be fabricated of an expanded metal or of a metal sheet material that has been perforated to save weight and material. Further, while the invention is described herein as applied to a fiber optic cable, the apparatus and methods may be applied to other utility conveyances and to other pipe-like structures having delicate cores. It is to be understood that the embodiments shown and described herein are only illustrative of the principles of the present invention and that various modifications may be implemented by those skilled in the art without departing from the scope and spirit of the invention.

What is claimed is:

1. A method for repairing an isolation gap after removing an isolation closure from an optical fiber cable, the isolation gap including a central gap in a metallic portion of the cable and two edge regions wherein the metallic portion is exposed; the method comprising the steps of:
   applying a polymer compound in the central gap;
   attaching a metallic strengthening member to the metallic portion exposed in both edge regions whereby the strengthening member bridges the central gap; and
   applying a sealing material over the metallic strengthening member.

2. The method of claim 1, wherein the step of applying the sealing material includes wrapping a sheet-like material over the metallic strengthening member.

3. The method of claim 2, wherein the sheet-like material is a heat-shrink material, and the method further comprises the step of:
applying heat to the sheet-like material to seal the material over the isolation gap.

4. The method of claim 1, wherein the step of attaching a metallic strengthening member to the metallic portion further comprises weaving mesh wires of the strengthening member with wires of the metallic portion.

5. The method of claim 1, further comprising the step of: curing the polymer compound.

6. The method of claim 1, further comprising the step of: applying a polymer sealant along edges of the sealing material.

7. The method of claim 1, further comprising the step of: closing the metallic strengthening member on the exposed metallic portion and the polymer compound by joining edges of the strengthening member with at least one wire threaded though openings in the edges.

8. A strengthening component for use in repairing an isolation gap when removing an isolation closure from an optical fiber cable, the component comprising:
a first curved wire mesh member forming a half-cylindrical surface having a straight hinge edge, a straight joining edge and two semi-circular edges;
a second curved wire mesh member forming a half-cylindrical surface having a straight hinge edge, a straight joining edge and two semi-circular edges;
at least one hinge component joining the hinge edge of the first member with the hinge edge of the second member; and
at least one locking member for locking the joining edge of the first member with the joining edge of the second member.

9. The component of claim 8, wherein the locking member is a wire threaded through openings in the mesh.

10. The component of claim 8, wherein the hinge component is a wire threaded through openings in the mesh.

11. The component of claim 8, wherein each wire mesh member further comprises free mesh wires on the semi-circular edges for weaving with metallic portions of the optical fiber cable, whereby tensile forces on the optical fiber cable are absorbed by the members.

12. An isolation gap repair kit having component parts capable of being assembled in the field to repair an isolation gap in an optical fiber cable, the isolation gap having metallic components of the cable removed to expose a poly sheath surrounding a fiber bundle, the cable having metallic components exposed on either side of the isolation gap, the repair kit comprising:
a quantity of polymer compound sufficient to fill a vacant space within the isolation gap, the compound formulated to cure after being applied in the vacant space, whereby fibers in the fiber bundle are protected from microbending;
a metallic strengthening member adapted to be affixed to the exposed metallic components on either side of the isolation gap; the strengthening member having attachment features that lock to the exposed metallic component, the strengthening member further adapted to at least partially surround the polymer compound in the isolation gap; and
a sheet of sealing material having a length sufficient to extend beyond ends of the strengthening member and a width sufficient to wrap around the strengthening member as installed on the cable, thereby protecting the isolation gap from moisture.

13. The kit of claim 12, wherein the metallic strengthening member comprises a cylindrical wall of wire mesh.

14. The kit of claim 13, wherein the attachment features are wires extending from edges of the mesh for weaving into the exposed metallic portion of the fiber optic cable.

15. The kit of claim 12, wherein the attachment features are hose clamps.

16. The kit of claim 12, further comprising a dispensing container for the curable polymer compound.

17. The kit of claim 12, wherein the curable polymer compound is a silicone compound.

18. The kit of claim 12, wherein the metallic strengthening member further comprises first and second half-cylindrical members having first lengthwise edges joined by a hinge member.

19. The kit of claim 18, wherein the first and second half-cylindrical members further have second lengthwise edges with locking members whereby the second lengthwise edges may be interlocked to form a complete cylinder.

20. The kit of claim 19, wherein the first and second half-cylindrical members are wire mesh, and the locking members are mesh loops interlocked by a wire threaded through the loops.

21. The kit of claim 12, further comprising a poly sealant for sealing edges of the sheet-like sealing material.

22. The kit of claim 12, wherein the sheet-like sealing material is a heat-shrink material.

* * * * *